United States Patent
Okada et al.

(10) Patent No.: US 8,386,743 B2
(45) Date of Patent: Feb. 26, 2013

(54) DATA UPDATE SYSTEM AND COMPUTER PROGRAM

(75) Inventors: Satoshi Okada, Okazaki (JP); Seiji Takahata, Okazaki (JP); Tomoki Kodan, Nagoya (JP); Hironobu Sugimoto, Toyota (JP)

(73) Assignee: Aisin Aw Co., Ltd., Toyota-Shi, Aichi-Ken (JP)

( * ) Notice: Subject to any disclaimer, the term of this patent is extended or adjusted under 35 U.S.C. 154(b) by 660 days.

(21) Appl. No.: 12/524,960

(22) PCT Filed: Mar. 31, 2008

(86) PCT No.: PCT/JP2008/056837
§ 371 (c)(1),
(2), (4) Date: Jul. 29, 2009

(87) PCT Pub. No.: WO2008/123619
PCT Pub. Date: Oct. 16, 2008

(65) Prior Publication Data
US 2010/0095076 A1   Apr. 15, 2010

(30) Foreign Application Priority Data
Mar. 30, 2007   (JP) ................................. 2007-091048

(51) Int. Cl.
*G06F 12/02* (2006.01)
*G06F 9/44* (2006.01)
*G05D 1/00* (2006.01)

(52) U.S. Cl. .................. 711/173; 701/24; 711/E12.005; 717/169

(58) Field of Classification Search .................. 711/162, 711/173, E12.04; 701/25
See application file for complete search history.

(56) References Cited

U.S. PATENT DOCUMENTS

| | | | |
|---|---|---|---|
| 6,425,125 B1 * | 7/2002 | Fries et al. | 717/168 |
| 6,601,212 B1 * | 7/2003 | Guha et al. | 714/776 |
| 6,615,365 B1 * | 9/2003 | Jenevein et al. | 714/6.11 |
| 7,490,006 B2 | 2/2009 | Sekine et al. | |
| 2003/0191911 A1 * | 10/2003 | Kleinschnitz et al. | 711/154 |

FOREIGN PATENT DOCUMENTS

| | | |
|---|---|---|
| JP | 11-143690 | 6/1999 |
| JP | 2004-287705 | 10/2004 |
| JP | 2006-323462 | 11/2006 |
| WO | WO 03-079144 | 9/2003 |
| WO | WO 03-085526 | 10/2003 |
| WO | WO 2006/018979 | 2/2006 |

OTHER PUBLICATIONS

Symantec. Norton Ghost User's Guide. 2002. Symantec. Documentation Version 6.8. pp. 61-70.* Japanese Office Action corresponding to counterpart Japanese Application No. 2007-091048, dated Mar. 10, 2011.
Office Action for Chinese Application No. 2008880002196.0 dated May 21, 2012 with full translation.

* cited by examiner

*Primary Examiner* — Nathan Sadler
(74) *Attorney, Agent, or Firm* — Bacon & Thomas, PLLC

(57) ABSTRACT

Art is provided that is capable of easily performing update processing in a short time even when updating numerous data of a storage medium of a navigation device. A directory structure corresponding to a partition structure of a storage medium is created. Image files IF are generated for updated data content within partitions HDn (n=0, 1, 2, 4, 6). The generated image files IF of the partitions HDn are stored in directories DIR that correspond to the partitions HDn in the created directory structure. Data content of the image files IF read from the directories DIR that correspond to the partitions HDn is written to the partitions HDn of the storage medium.

9 Claims, 4 Drawing Sheets

DATA UPDATE SYSTEM AND COMPUTER PROGRAM

TECHNICAL FIELD

The present invention relates to a data update system in which communication is performed with a navigation device having a storage medium divided into a plurality of partitions to enable updating of data in the storage medium, and a computer program related thereto.

BACKGROUND ART

A known data update system performs communication with a navigation device having a large-capacity storage medium such as a hard disk to enable updating of data in the storage medium (see Patent Document 1, for example). The data update system according to Patent Document 1 is structured such that various map data and the like are stored in the storage medium in units of records, and data is updated in such units of records. In other words, for updating in units of records, an updating file having post-update data for the update-targeted record is generated and sent to the navigation device. Then in the navigation device that received the updating file, the data of the update-targeted record stored in the storage medium is overwritten by the data of the received updating file, thereby updating the data of the storage medium. Accordingly, the updating file can be generated as a small-volume file that does not include record data for which updating is not required. Therefore, it is possible to reduce the communication volume, memory volume, and update time needed in order to input the updating file.

[Patent Document 1]
Japanese Patent Application Publication No. JP-A-2004-287705

DISCLOSURE OF THE INVENTION

Problem to be Solved by the Invention

In recent navigation devices, respective data such as road network data in the storage medium relate to each other in a complicated manner. Furthermore road and location information frequently changes, which increases the quantity of data that must be updated. In cases where an extremely large quantity of data is updated in units of records, associated processing occurring each time a record is updated must be frequently performed, such as seeking the record or records and control data pertaining thereto (moving a head to a target position of the storage medium). As a consequence, update processing is extremely complicated and requires time.

The present invention was devised in light of the foregoing problems, and it is an object of the present invention to provide a data update system capable of easily performing update processing in a short time, even when updating numerous data of a storage medium of a navigation device, and a computer program related thereto.

Means for Solving the Problem

In order to achieve the above object, a data update system according to the present invention is capable of performing communication with a navigation device that has a storage medium divided into a plurality of partitions and updating data of the storage medium. A first aspect of the data update system is characterized by including:

directory creation means for creating a directory structure that corresponds to a structure of the plurality of partitions in the storage medium;
image file generation means for generating an image file of updated data content within the partitions;
image file storage means for storing the image file of the partitions generated by the image file generation means, in a directory corresponding to the partitions in the directory structure created by the directory creation means; and
data update means for writing data content of the image file to the partitions of the storage medium, wherein the image file is read from the directory corresponding to the partitions.

According to the first aspect, a directory structure is created corresponding to the structure of the plurality of partitions that divide the storage medium of the navigation device. Updated data content in the partitions corresponding to the directories in the directory structure is made unchanged into files, and such generated image files are respectively stored in the directories of the directory structure. Accordingly, the data of the storage medium can be updated through simple processing in which the data content of image files read from the directories corresponding to the partitions is written without change to the respective partitions of the storage medium. With such update processing, no auxiliary processing is required such as seeking a record or records and control data pertaining thereto (moving a head to a target position of the storage medium). Therefore, even when numerous data is updated in the storage medium, the update processing can be easily performed in a short time.

A second aspect of the data update system according to the present invention is characterized in that the image file generation means arranges the updated data content in a memory area that is similar in size to the partition, and generates the image file using data in a region ranging from a beginning to a last-used cluster in the memory area.

According to the second aspect, the updated data content is arranged in a memory area that is similar in size to the partition. Therefore, it is possible to refer to a cluster control area such as a FAT area or the like of the arranged data content, and detect the last-used cluster controlled by the file system in the data content. Also, the image file is generated using the data content from a region ranging from the beginning to the last-used cluster in the memory area. Therefore, the image file generated is a small-volume file that does not include the data content subsequent to the last-used cluster, making it possible to reduce the communication volume, memory volume, and update time needed in order to input the image file.

A third aspect of the data update system according to the present invention, in addition to the first and second aspects, is characterized in that the image file generation means respectively generates image files with a recognizable layout order, using respective data content wherein the updated data content has been divided into a set size.

According to the third aspect, the image files are respectively generated using respective data content, wherein the updated data content is divided into a set size in the partition. Thus, for example, the set size can be specified as a maximum size allowed by the file system, making it possible to generate an image file whose volume is equal to or less than the maximum size. Also, the image files generated with respect to one partition have a recognizable layout order, such as a serial number name following the layout order in the partition. Therefore, it is possible to accurately read out the respective image files according to the layout order, while also accurately and serially writing the data content of the respective image files to the partition of the storage medium in accordance with the layout order.

A fourth aspect of the data update system according to the present invention, in addition to the first to third aspects, is characterized in that the data update means is structured so as to execute error detection processing for written data content each time the image file is written.

According to the fourth aspect, the error detection processing is executed each time the data content of an image file is written to the partition. Therefore, if an error such as a write error is detected, then only re-writing of the data content of that image file is required and an increase in the update time is suppressed.

In order to achieve the above object, a computer program according to the present invention operates a computer so as to perform communication with a navigation device having a storage medium divided into a plurality of partitions and update data of the storage medium. The computer program is characterized by including:

a directory creation step for creating a directory structure that corresponds to a structure of the plurality of partitions in the storage medium;

an image file generation step for generating an image file of updated data content within the partitions;

an image file storage step for storing the image file of the partitions generated at the image file generation step, in a directory corresponding to the partitions in the directory structure created at the directory creation step; and a data update step for writing data content of the image file to the partitions of the storage medium, wherein the image file is read from the directory corresponding to the partitions.

Namely, using a computer to execute a computer program having the above aspects enables the computer to function as the various means in the first aspect of the data update system according to the present invention as described above, whereby an operation and effect identical to the first aspect can be achieved.

DESCRIPTION OF THE REFERENCE NUMERALS

1 NAVIGATION DEVICE
2 STORAGE MEDIUM
11 DIRECTORY CREATION MEANS
12 IMAGE FILE GENERATION MEANS
13 IMAGE FILE STORAGE MEANS
14 DATA UPDATE MEANS

BEST MODES FOR CARRYING OUT THE INVENTION

Figure 1:
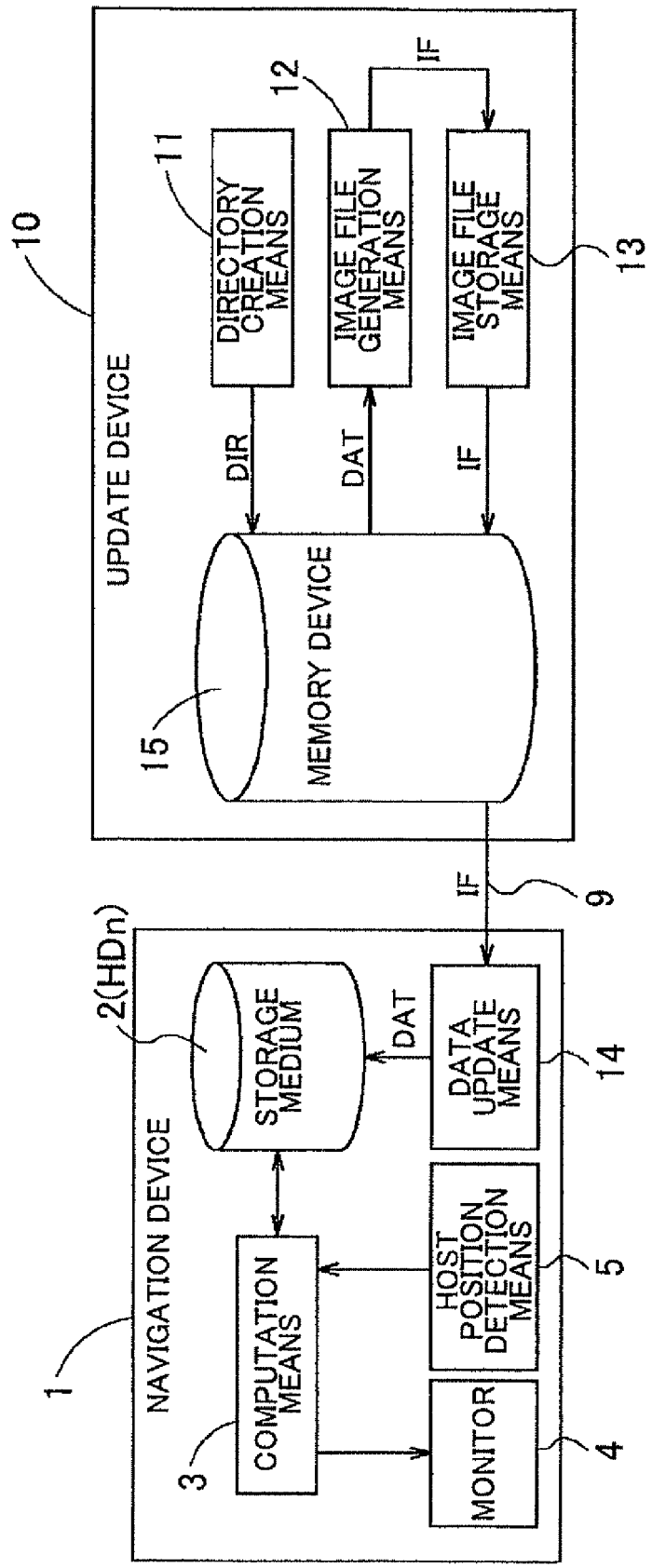
FIG. 1 is a drawing showing a schematic structure of a data update system according to the present invention.

An embodiment of a data update system and computer program according to the present invention will be explained below with reference to the drawings. A data update system shown in FIG. 1 is structured so as to communicate with a navigation device 1 installed in a vehicle, and enable updating of data in a storage medium 2 provided in the navigation device 1. First, the structure of the navigation device 1 will be described.

Referring to FIG. 1, the navigation device 1 is structured such that respective functional parts for performing various processing with respect to data input by computation means 3, which is formed from a computer such as a CPU, are structured with hardware, software (a program), or both.

The navigation device 1 is also provided with host position detection means 5 for detecting a current position of the navigation device 1. Although not shown, the host position detection means 5 includes a GPS receiving unit, an orientation sensor, and a distance sensor, for example. Based on information obtained therefrom, information regarding coordinates, travel orientation and the like, which indicate the current position, is obtained and output to the computation means 3.

The computation means 3 is structured so as to display data that is read out from the storage medium 2 with a host vehicle position that is identified based on output from the host position detection means 5. This is then displayed on a monitor 4, whereby optimal route guidance to a destination or the like is performed. More specifically, the computation means 3 obtains data pertaining to map information of the host vehicle position surroundings from the storage medium 2. Based on such data and the identified current position of the vehicle, the computation means 3 then performs various computational processing for vehicle route guidance, and outputs a control command to the monitor 4 and the like. The computation means 3 superimposes an image indicating the current position of the vehicle on a map image generated based on the above data, which is displayed on the monitor 4. In addition, based on road shapes and the like included in the data pertaining to map information in the vehicle's direction of travel, as well as the current position, the computation means 3 uses the monitor 4 or the like to communicate route guidance to a driver at an appropriate timing.

Figure 2:
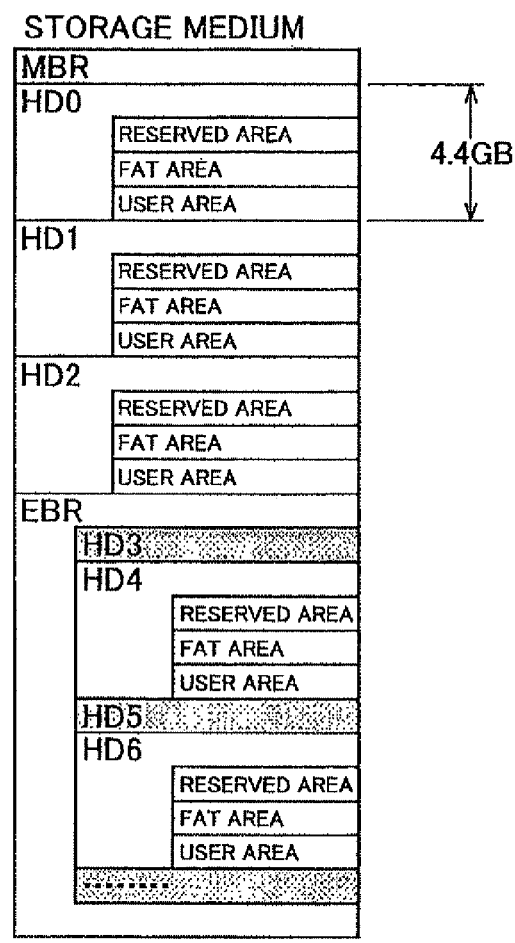
FIG. 2 is a drawing showing a structure of a plurality of partitions in a storage medium of a navigation device.

As FIG. 2 shows, the storage medium 2 included in the navigation device 1 is divided into a plurality of partitions HDn (n=0, 1, 2, 3, 4, . . . ) as in a normal hard disk or the like. A plurality of data structuring map information is stored in the partitions HDn using a known FAT file system or the like. Note that, similar to a hard disk drive, the storage medium 2 is structured together with driving means for driving the storage medium 2 as hardware.

A structure for updating data of the storage medium 2 included in the navigation device 1 will be described next. The data update system shown in FIG. 1 will be described in detail later. However, the data update system is structured by an update device 10 or the like, which is formed from a computer that is installed together with the navigation device 1 by a dealer or the like involved in vehicle sales and maintenance. Also, the update device 10 is structured so as to be capable of communication with the navigation device 1 equipped with at least the storage medium 2, via a known hardware interface 9 such as IEEE 1394. The update device 10 is further structured so as to be capable of accessing a memory device 15, which is a hard disk or the like that stores a plurality of updating data and the like pertaining to the latest map information stored in the storage medium 2 of the navigation device 1.

In order to execute update processing with respect to the storage medium 2 of the navigation device 1, in which desired data is read/written and used to update data stored in the storage medium 2, the data update system is structure to function as directory creation means 11, image file generation means 12, and image file storage means 13, which will be described later. This is achieved executing a predetermined computer program in a computer provided in the update device 10. Likewise, by executing a predetermined computer program in a computer provided in the navigation device 1, the data update system is also structured to function as data update means 14, which will also be described later.

Explanations of the detailed structures of the various means for performing update processing are given below along with a process flow of the update processing shown in FIG. 3.

Figure 3:
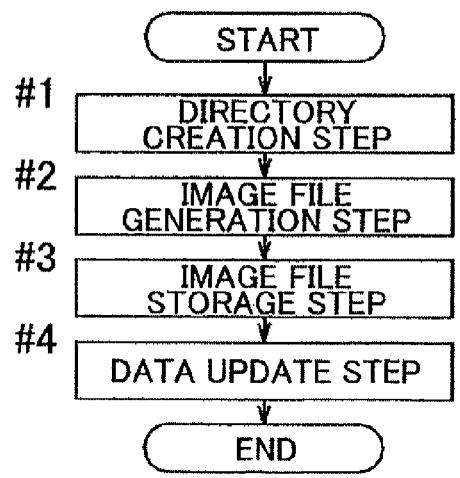
FIG. 3 is a drawing showing a process flow of update processing executed by the data update system according to the present invention.
Figure 4:
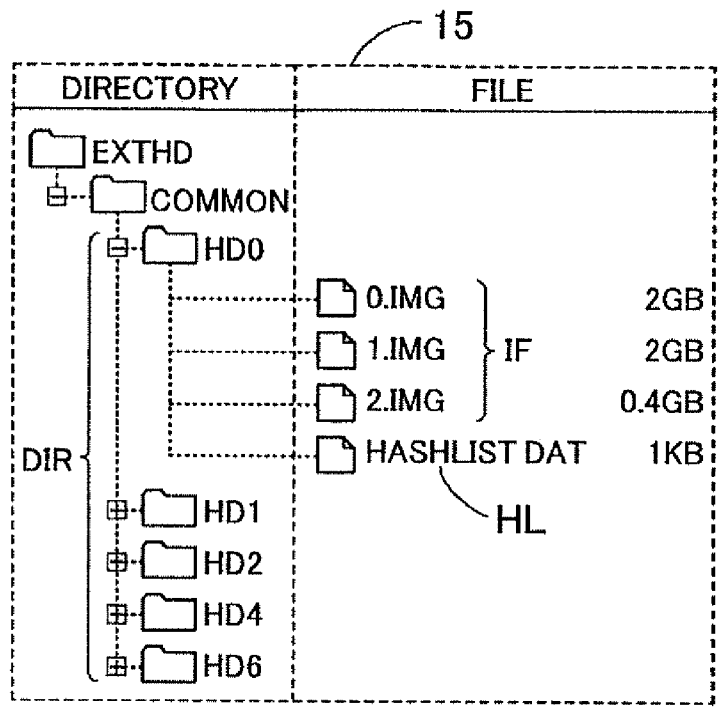
FIG. 4 is a drawing showing a storage condition in an image file directory generated for a first image file.
Figure 6:
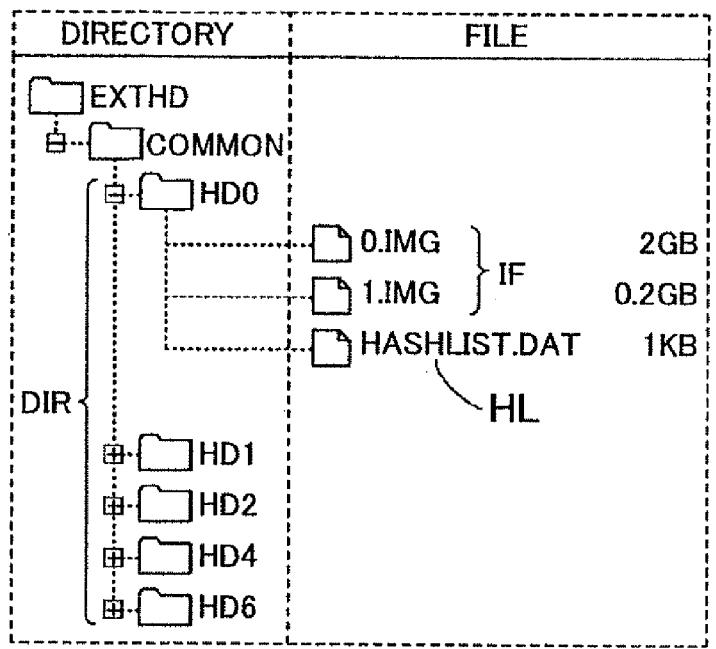
FIG. 6 is a drawing showing a storage condition in an image file directory generated for a second image file.

According to the process flow shown in FIG. 3, first, the directory creation means 11 on the update device 10 side executes a directory creation step (#1) that creates a directory structure corresponding to the structure of the plurality of partitions in the storage medium 2. Namely, at the directory creation step (#1), the directory creation means 11 obtains partition names and the like with a recognizable layout order of the partitions HDn in the storage medium 2 of the navigation device 1. As shown in FIGS. 4 and 6, a directory structure is created that corresponds to the structure of the plurality of partitions in the storage medium 2, where directories DIR are arranged within the memory device 15 and assigned with names identical to the partition names.

However, if only a portion, i.e., the partitions HD0, HD1, HD2, HD4, and HD6, among all the partitions HDn of the storage medium 2 are targeted for updating and the other partitions HD3 and HD5 are not targeted for updating, then at the directory creation step (#1) only a directory DIR corresponding to the update-targeted partitions HD0, HD1, HD2, HD4, and HD6 may be arranged. Note that in the following descriptions, the partition HDn refers to the update-targeted partitions HD0, HD1, HD2, HD4, and HD6.

According to the process flow shown in FIG. 3, next, the image file generation means 12 on the update device 10 side executes an image file generation step (#2) that generates an image file IF of updated data content DAT within the partitions HDn. Namely, at the image file generation step (#2), the partitions HDn are successively set as target partitions while the image file IF is generated for such target partitions. Note that a generation procedure of the image file IF for the target partition may employ either of first and second image generation procedures described below.

(First Image File Generation Procedure)

Figure 5:
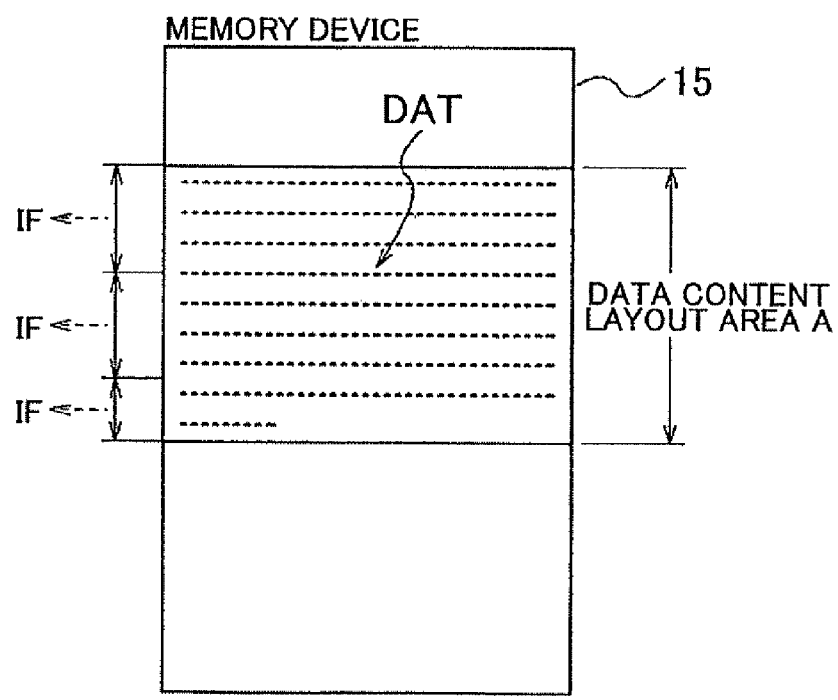
FIG. 5 is a drawing showing a procedure for generating the first image file.

In the first image file generation procedure, as shown in FIG. 5, a memory region that is the same size as the target partition is secured as a data layout area A within the memory device 15. The updated data content DAT within the target partitions generated from the plurality of updating data pertaining to the latest map information is arranged in the data layout area A. The arranged data content DAT is then divided into a set size that is preset, and image files IF are respectively generated using the respective divided data content. Note that in the present embodiment, the above set size can be arbitrarily set. For example, the set size may be set to a maximum size of 2 GB as allowed by the FAT file system. Accordingly, if the target partition is specified as the partition HD0 with 4.4 GB, then in the first image file generation procedure, three image files IF are generated for the partition HD0, namely, two 2-GB image files IF, and one 0.4-GB image file IF, as shown in FIG. 4. When a plurality of image files IF is divided according to a set size and generated with respect to a target partition in this manner, in order to identify the layout order of the image files IF, the image files IF are assigned serial numbers following the above layout order.

(Second Image File Generation Procedure)

Figure 7:
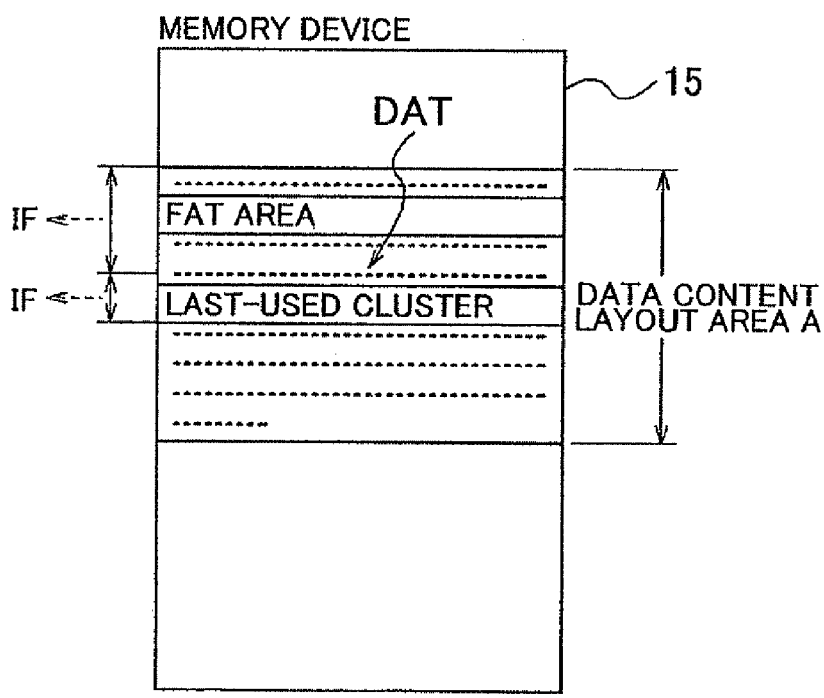
FIG. 7 is a drawing showing a procedure for generating the second image file.

In the second image file generation procedure, as shown in FIG. 7, a cluster control area of the FAT area or the like is referred to in the updated data content DAT arranged in the data layout area A, similar to the first image file generation procedure described above, whereby a last-used cluster controlled by the file system in the data content DAT is detected. Using the data content DAT in a region of the data layout area A ranging from the beginning to the last-used cluster, such a region is divided into a set size, similar to the first image file generation procedure, and the image files IF are generated. Thus, the respective image files IF generated in such a manner have small volumes and do not include data content subsequent to the last-used cluster. For example, if the size of the region in the partition HD0 ranging from the beginning to the last-used cluster is 2.2 GB, then three image files IF are generated with respect to the partition HD0 in the first image file generation procedure described above; however, in the second image file generation procedure, as shown in FIG. 6, two image files IF are generated, namely, one 2-GB image file IF and one 0.2 GB image file IF. In other words, the size of the image file IF generated with respect to a partition is small. Therefore, a communication volume when receiving the image file IF in the navigation device 1, a memory volume for temporarily storing the image file IF, an update time for writing the image file IF to the storage medium 2, and so on are reduced.

According to the process flow shown in FIG. 3, next, the image file storage means 13 on the update device 10 side executes an image file storage step (#3) that stores the image files IF of the partitions HDn, which were generated by the image file generation means 12, in the directories DIR that correspond to the partitions HDn in the directory structure created by the directory creation means 11. Furthermore, at the image file storage step (#3), when storing the respective image files IF corresponding to a directory DIR, hash values of the data content held in the respective image files are respectively generated, and a hash value list file HL that lists the respective hash values is stored in the same directory DIR.

According to the process flow shown in FIG. 3, next, the data update means 14 on the navigation 1 side executes a data update step (#4) that writes to the respective partitions HDn, which is in the storage medium 2 provided in the navigation device 1, the data content DAT of the image file IF, which is read out from the directory DIR corresponding to the partition. Namely, at the data update step (#4), the partitions HDn are set as serial target partitions, and at the same time, the image files IF that correspond to the target partitions, which are received from the update device 10-side memory device 15 via the hardware interface 9, are read for the target partitions. The data content DAT held in the read image files IF is then written without change into the corresponding partition. Through such simple processing, the data stored in the partitions HDn of the storage medium 2 are updated to the latest data. In other words, at the data update step (#4), seeking only occurs when moving between the partitions HDn. Therefore, even when numerous data is updated in the storage medium 2, the update processing is easily performed in a short time.

In cases where there are a plurality of image files IF divided into a set size with respect to one target partition, at the data update step (#4), the fact that the names of the image files IF are recognizable as a layout order of serial numbers or the like is utilized to read out the respective image files IF in the layout order. At the same time, the data content DAT of the respective images files IF is successively written to the target partition of the storage medium 2 in accordance with the layout order in sequence starting from the beginning.

At the data update step (#4), error detection processing is also executed for the written data content DAT each time an image file IF is written. In such error detection processing, a hash value of the written data content DAT is generated, and the hash value of the data content DAT in the image file IF is obtained from the list file HL. Thereafter, the hash value of the written data content DAT and the hash value of the data content DAT in the image file IF are compared. If the hash values do not match, then an error such as a write error is detected. At the data update step (#4), if an error is detected by the error detection processing after writing a certain image file IF, then only that image file IF is re-written. Therefore, an increase in update time such as caused by re-writing all the image files IF is suppressed.

OTHER EMBODIMENTS (1) According to the above embodiment, various means provided in the data update system are structured such that respective computers of the update device 10 and the navigation device 1 function capable of mutual communication. However, the layout of the devices, communication mode, and the like may be modified as appropriate.

(2) According to the above embodiment, the navigation device 1 is structured to function as the data update means 14. However, the update device may function as the data update means instead, with the update device functioning as the data update means structured so as to directly access the storage medium in the navigation device via the hardware interface in order to write the data content of the image file.

(3) According to the above embodiment, the error detection processing executed at the data update step (#4) may be performed as a separate processing procedure or omitted as appropriate.

INDUSTRIAL APPLICABILITY

The data update system and computer program according to the present invention can be effectively utilized as a data update system capable of easily performing update processing in a short time, even when updating numerous data of a storage medium of a navigation device, and a computer program related thereto.

The invention claimed is:

1. A data update system including a memory device, said data update system capable of performing communication with a navigation device that has a storage medium divided into a plurality of partitions and updating data of the storage medium, the data update system comprising:
   directory creation means for creating a directory structure in the memory device of the data update system by obtaining partition names of partitions in the storage medium and creating in the memory device a directory structure that corresponds to a structure of the partitions in the storage medium, wherein directory names of the directories in the directory structure created in the memory device are identical to partition names of the partitions in the storage medium;
   image file generation means for generating an image file of updated data content that is to be stored within the partitions of the storage medium of the navigation device, wherein the data update system stores in the memory device of the data update system the image file of updated data content that is generated by the image file generation means, said image file being stored in a directory of the directory structure created by the directory creation means; and
   data update means for writing data contents of the image file to the partitions of the storage medium, wherein the image file is read from the directory corresponding to the partitions.

2. The data update system according to claim 1, wherein the image file generation means arranges the updated data content in a memory area that is similar in size to the partition, and generates the image file using the data content in a region ranging from a beginning to a last-used cluster in the memory area.

3. The data update system according to claim 2, wherein the image file generation means generates the image files with a recognizable layout order, using respective data content wherein the updated data content has been divided into a set size.

4. The data update system according to claim 3, wherein the data update means is structured so as to execute error detection processing for written data content each time the image file is written.

5. A non-transitory computer-readable storage medium having, encoded thereon, a program that operates a computer so as to perform communication with a navigation device having a storage medium divided into a plurality of partitions and update data of the storage medium, the computer program comprising:
   a directory creation step for creating a directory structure in the memory device of the data update system by obtaining partition names of partitions in the storage medium and creating in the memory device a directory structure that corresponds to a structure of the partitions in the storage medium, wherein directory names of the directories in the directory structure created in the memory device are identical to partition names of the partitions in the storage medium;
   an image file generation step for generating an image file of updated data content that is to be stored within the partitions of the storage medium of the navigation device, wherein the computer program stores in the memory device of the data update system the image file of updated data content that is generated at the image file generation step, said image file being stored in a directory of the directory structure created by the directory creation step; and
   a data update step for writing data content of the image file to the partitions of the storage medium, wherein the image file is read from the directory corresponding to the partitions.

6. The data update system according to claim 1, wherein the image file generation means generates image files with a recognizable layout order, using respective data content wherein the updated data content has been divided into a set size.

7. The data update system according to claim 6, wherein the data update means is structured so as to execute error detection processing for written data content each time the image file is written.

8. The data update system according to claim 2, wherein the data update means is structured so as to execute error detection processing for written data content each time the image file is written.

9. The data update system according to claim 1, wherein the data update means is structured so as to execute error detection processing for written data content each time the image file is written.

* * * * *

UNITED STATES PATENT AND TRADEMARK OFFICE
CERTIFICATE OF CORRECTION

| | |
|---|---|
| PATENT NO. | : 8,386,743 B2 |
| APPLICATION NO. | : 12/524960 |
| DATED | : February 26, 2013 |
| INVENTOR(S) | : Satoshi Okada et al. |

It is certified that error appears in the above-identified patent and that said Letters Patent is hereby corrected as shown below:

On the Title page, item (73), the assignee information should be corrected to read:

Assignees: Aisin AW., Ltd., Anjo-shi; Toyota Jidosha Kabushiki Kaisha, Toyota-shi, both of Japan Signed and Sealed this
Seventh Day of May, 2013

Teresa Stanek Rea
*Acting Director of the United States Patent and Trademark Office*